United States Patent [19]

Kaiser et al.

[11] 3,917,847
[45] Nov. 4, 1975

[54] ALPHA-AMINOALKYL-4-HYDROXY-3-UREIDOBENZYL ALCOHOLS AS BRONCHODILATORS

[75] Inventors: Carl Kaiser, Haddon Heights, N.J.; Stephen T. Ross, Berwyn, Pa.

[73] Assignee: Smith Kline Corporation, Philadelphia, Pa.

[22] Filed: May 29, 1973

[21] Appl. No.: 364,592

Related U.S. Application Data

[60] Division of Ser. No. 105,698, Jan. 11, 1971, Pat. No. 3,763,232, which is a continuation-in-part of Ser. No. 12,151, Feb. 17, 1970, abandoned.

[52] U.S. Cl. ............................................. 424/322
[51] Int. Cl.² ......................................... A61K 31/17
[58] Field of Search ..................................... 424/322

[56] References Cited
UNITED STATES PATENTS

| | | | |
|---|---|---|---|
| 2,393,820 | 1/1946 | Schnider | 260/501.17 |
| 3,049,564 | 8/1962 | Waring | 260/553 A |
| 3,145,209 | 8/1964 | Krapcho | 260/553 A |
| 3,644,520 | 2/1972 | Hartley et al. | 260/553 A X |
| 3,657,319 | 4/1972 | Kaiser et al. | 260/343.7 X |

*Primary Examiner*—Norman A. Drezin
*Attorney, Agent, or Firm*—Richard D. Foggio

[57] ABSTRACT

α-Aminoalkyl-4-hydroxy-3-ureidobenzyl alcohols having β-adrenergic stimulant activity, particularly as selective bronchodilators, are prepared generally from 3-amino-4-benzyloxyphenones by, for example, conversion to an isocyanate, reaction with ammonia or a monosubstituted alkyl or aryl amine to give 3-ureidophenones, bromination of these phenones and treatment of the resulting α-bromo derivatives with an N-benzyl secondary amine, followed by catalytic hydrogenation to remove the benzyl groups and reduce the ketone moiety.

19 Claims, No Drawings

ALPHA-AMINOALKYL-4-HYDROXY-3-UREIDO-BENZYL ALCOHOLS AS BRONCHODILATORS

This is a division of application Ser. No. 105,698 filed Jan. 11, 1971, now U.S. Pat. No. 3,763,232, which application is a continuation-in-part of application Ser. No. 12,151, filed Feb. 17, 1970, now abandoned.

This invention relates to novel α-aminoalkyl-4-hydroxy-3-ureidobenzyl alcohols which have useful pharmacodynamic activity. More specifically the compounds of this invention have utility as β-adrenergic stimulants with relatively greater activity on respiratory smooth muscle than on cardiac muscle. Therefore these compounds have direct bronchodilator action with minimal cardiac stimulation as demonstrated in standard pharmacological test procedures.

Two in vitro test systems used for determining selective β-stimulant activity are: (1) effect on spontaneous tone of guinea pig tracheal chain preparations as a measure of β-stimulant (direct relaxant) effect on airway smooth muscle, and (2) effect on rate of spontaneously beating right atria of the guinea pig as a measure of β-stimulant effect on cardiac muscle. The compounds of this invention have selective bronchodilating properties since they are active in (1) above at a dose lower than is required in (2) above resulting in a positive separation ratio.

The compounds of this invention are represented by the following general structural formula:

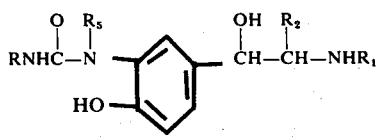

FORMULA I in which:
R represents hydrogen, lower alkyl of from 1 to 5 carbon atoms, straight or branched chain, phenyl, dimethylaminoethyl or dimethylaminopropyl;
$R_1$ represents a branched chain lower alkyl group of from 3 to 5 carbon atoms, a cycloalkyl or cycloalkylmethyl group, the cycloalkyl moiety having from 3 to 6 carbon atoms,

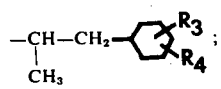

$R_2$ represents hydrogen, methyl or ethyl;
$R_3$ and $R_4$ represent hydrogen, hydroxy or methoxy; and
$R_5$ represents hydrogen or methyl.

Preferred compounds of this invention are represented by formula I above when R is hydrogen or methyl; $R_1$ is isopropyl, t-butyl, cyclopropyl, cyclopentyl, 4-hydroxyphenylisopropyl or 3,4-dimethoxyphenylisopropyl; and $R_2$ and $R_5$ are hydrogen.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicylic, methanesulfonic, ethanedisulfonic, acetic, oxalic, propionic, tartaric, salicylic, citric, gluconic, aspartic, stearic, palmitic, itaconic, glycolic, p-aminobenzoic, glutamic, benzenesulfonic, hydrochloric, hydrobromic, sulfuric, cyclohexyl sulfamic, phosphoric and nitric acids.

Compounds of this invention may be present as d, l optical isomers. Further the compounds of Formula I in which $R_2$ represents methyl or ethyl may be present as diastereoisomers and are designated as erythro and threo isomers which may be resolved into optical isomers. Resolution of optical isomers may be conveniently accomplished by fractional crystallization of their salts with optically active acids such as, for example, tartaric, camphor-10-sulfonic, o,o-dibenzoyltartaric, o,o-di(p-toluoyl)tartaric, menthyloxyacetic, camphoric, or 2-pyrrolidone-5-carboxylic acids or N-acetyltryptophane from appropriate solvents. Unless otherwise specified in the claims, it is intended to include all isomers, whether separated or mixtures thereof.

A preferred compound of this invention is α-(t-butylaminomethyl)-4-hydroxy-3-ureidobenzyl alcohol which relaxes the spontaneous tone of guinea pig tracheal ring preparation of an $ED_{50}$ of 0.0052 mcg/ml while increasing the rate of contraction of guinea pig right atria at an $ED_{25}$ of 0.168 mcg/ml. These activities give an absolute separation ratio of 33 which is a 66-fold improvement when compared to the corresponding activity of d, l-isoproterenol (absolute separation ratio = 0.5) in similar in vitro preparations.

The compounds of this invention where $R_5$ is hydrogen are prepared as shown in the following sequence of reactions:

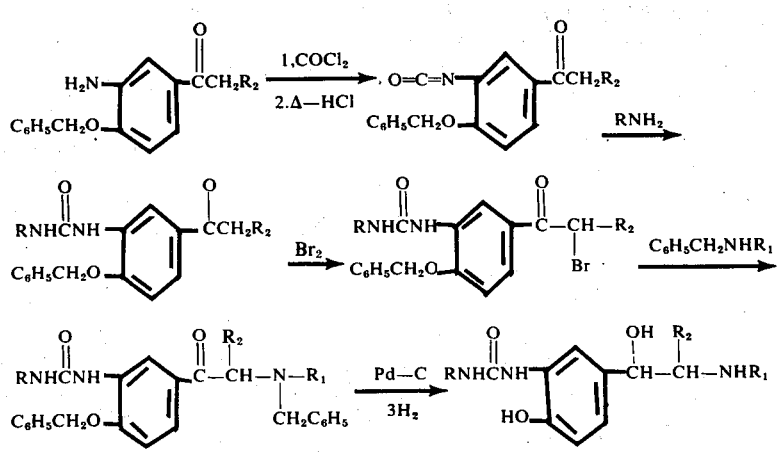

in which R, $R_1$ and $R_2$ are as defined in formula I. Thus, as shown above, an aminooenzyloxyphenone is treated with phosgene and then heated to give the isocyanate which is reacted with ammonia or a monosubstituted alkyl or aryl amine to yield the ureidophenone derivative. The latter is treated with bromine or pyrrolidone hydrotribromide and the resultant α-bromophenone is reacted with an N-benzylamine to give the corresponding α-benzylaminophenone. This derivative is hydrogenated catalytically, preferably with palladium-on-carbon, to give the debenzylated ureidobenzyl alcohol product.

To prepare the compounds of this invention where R is hydrogen and $R_5$ is hydrogen or methyl, an aminobenzyloxyphenone of the following formula:

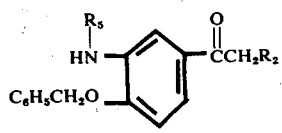

in which $R_2$ is as defined in formula I, preferably in acetic acid solution, is treated with aqueous sodium cyanate to yield the corresponding ureidophenone derivative which is then carried through the same sequence of reactions as described above to obtain the products.

The compounds of this invention where R is other than hydrogen as defined in formula I and $R_5$ is methyl are prepared from an aminobenzyloxyphenone of the following formula:

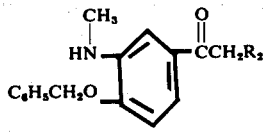

in which $R_2$ is as defined in formula I, by treating with phosgene to give a carbamyl chloride derivative which is then reacted with an appropriately substituted amine to yield the N,N'-disubstituted ureidophenone. The latter is subsequently reacted according to the above described sequence to give the benzyl alcohol products. Alternatively the aminobenzyloxyphenone is reacted with an appropriately substituted isocyanate to give the N,N'-disubstituted ureidophenone.

It will be appreciated that the benzylated derivatives of the following formula:

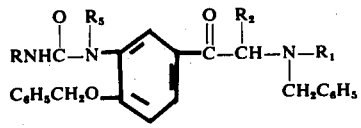

in which R, $R_1$, $R_2$ and $R_5$ are as defined in formula I, are useful intermediates in the preparation of the products of this invention and as such form a part of the invention.

The aminobenzyloxyphenones used as starting materials herein are known or are prepared by methods known in the art. For example, a 4-hydroxyphenone is nitrated with nitric acid at −20° to −30°C. to yield the 4-hydroxy-3-nitrophenone which is reacted with benzyl chloride in the presence of potassium hydroxide or potassium carbonate to give the 4-benzyloxy-3-nitrophenone and the latter is reduced to the 3-amino-4-benzyloxyphenone using Raney nickel and hydrazine hydrate, platinum oxide and hydrogen or sodium sulfhydrate ($NaSH.2H_2O$) in dimethylformamide. The amino group is N-methylated by standard procedures.

The compounds of this invention may be administered orally or parenterally in conventional dosage unit forms such as tablets, capsules, injectables or the like, by incorporating the appropriate dose of a compound of formula I, with carriers according to accepted pharmaceutical practices. Preferably a compound or an acid addition salt thereof is administered orally to an animal organism in a tablet or capsule comprising an amount sufficient to produce β-adrenergic stimulant activity. Each dosage unit will contain the active medicament in an amount of about 3 to about 40 mg., preferably about 5 mg. to about 20 mg. Advantageously equal doses will be administered 2 to 4 times daily with the daily dosage regimen being about 6 mg. to about 160 mg., preferably about 10 mg. to about 80 mg.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form, or in the form of a troche or lozenge. The amount of solid carrier will vary widely but preferably will be about 25 mg. to about 1 g. If a liquid carrier is used, the preparation will be in the form of a syrup, emulsion, soft gelatin capsule, sterile injectable liquid such as an ampule, or an aqueous or nonaqueous liquid suspension.

Of particular applicability is an aerosol dispensing system wherein the active medicament is incorporated with Freon (fluorohydrocarbon) or other inert propellant in an aerosol container. Such an aerosol system will deliver a metered dose of about 100 to about 650 mcg., administered once or twice at a time as needed.

The foregoing is a general description of how to prepare the compounds of this invention. The following examples illustrate the preparation of specific compounds having β-adrenergic stimulant activity. However this should not be construed as a limitation of the invention since appropriate variations in the starting materials will produce other products set forth hereinabove.

EXAMPLE 1

A stirred solution of 40 g. (0.41 m.) of phosgene in 150 ml. of toluene is held at 25°C. with a cooling bath while a mixture of 25.2 g. (0.105 m.) of 3-amino-4-benzyloxyacetophenone and 220 ml. of toluene are added slowly. The mixture is heated to reflux and continued for 30 minutes. Nitrogen is passed through the mixture and then concentrated in vacuo to give a crystalline isocyanate, m.p. 105°–106°C.

A stirred solution of the isocyanate (28.0 g.) in 500 ml. of dry benzene is saturated with ammonia. After one hour, the mixture is cooled to give the crystalline 4-benzyloxy-3-ureidoacetophenone, m.p. 184°–186°C.

To a stirred solution of 5.7 g. (0.02 m.) of 4-benzyloxy-3-ureidoacetophenone in 100 ml. of chloroform is added 3.2 g. (0.02 m.) of bromine. The mixture is stirred at room temperature for about 45 minutes and the solution is concentrated in vacuo at 25°–30°C. The amorphous residue (hydrobromide salt of 4-benzyloxy-α-bromo-3-ureidoacetophenone) is dissolved in 80 ml. of acetonitrile and 9.8 g. (0.06 m.) of N-benzyl-N-t-butylamine is added. The mixture is stirred and refluxed for 1.5 hours, then it is cooled to 0°C. in an icebath. Crystalline N-benzyl-N-t-butylamine hydrobromide is filtered. The filtrate is acidified with ethereal hydrogen chloride. The semi-crystalline product is filtered after diluting the mixture with a large excess of ether. Trituration of the product with 60 ml. of cold ethanol gives 4-benzyloxy-α-(N-benzyl-N-t-butylamino)-3-ureidoacetophenone hydrochloride, m.p. 200°–221°C. (dec.).

A solution of 10.5 g. (0.0218 m.) of 4-benzyloxy-α-(N-benzyl-N-t-butylamino)-3-ureidoacetophenone hydrochloride in 65 ml. of methanol and 25 ml. of water is added to a suspension of 1.5 g. of 10% palladium-on-carbon in 10 ml. of water. The mixture is hydrogenated on the Parr apparatus at room temperature, using an initial pressure of 60 psi of hydrogen. After 4 hours about 80% of the theoretical volume of hydrogen has been absorbed. The mixture is filtered, an additional 1.5 g. of 10% palladium-on-carbon is added and the mixture is again hydrogenated on the Parr apparatus under the same conditions. After hydrogenating for an additional 3 hours, the mixture is filtered and the filtrate is concentrated in vacuo. The residue is stripped twice with toluene and crystallized with ether-ethanol to give α-(t-butylaminomethyl)4-hydroxy-3-ureidobenzyl alcohol hydrochloride, m.p. 214°–215°C.

EXAMPLE 2

Into a solution of 2.4 g. (0.008 m.) of the isocyanate prepared in Example 1 in 35 ml. of dry benzene is passed methyl amine gas for one hour. The reaction mixture is cooled and filtered to give 4-benzyloxy-3-(N'-methylureido) acetophenone, m.p. 165°–167°C.

To a suspension of 1.5 g. (0.005 m.) of the above ureidoacetophenone in 20 ml. of chlorofrom and 0.2 g. of benzoyl peroxide is added 0.84 g. (5% excess) of bromine in 2 ml. of chloroform. The reaction mixture is stirred at room temperature for 45 minutes and then concentrated in vacuo at 40°–50°C. The residue is triturated with ethanol to give 4-benzyloxy-α-bromo-3-(N'-methylureido)-acetophenone, m.p. 182°–184°C.

A mixture of 1.8 g. (0.005 m.) of 4-benzyloxy-α-bromo-3-(N'-methylureido)-acetophenone, 1.5 g. (0.01 m.) of N-benzylisopropylamine and 20 ml. of acetonitrile is stirred at 40°–50°C. for 1 hour, then it is cooled and diluted with 20 ml. of ether. The reaction mixture is filtered (N-benzylisopropylamine hydrobromide) and the filtrate acidified (carefully) to give a flocculent solid. The solid is filtered, dissolved in 80 ml. of ethanol and 20 ml. of water, 1 g. of palladium-carbon is added and the mixture is hydrogenated on a Parr shaker (initial hydrogen pressure 60 psi and room temperature). The mixture is filtered, after hydrogen uptake is completed (about 45 minutes) and the filtrate is concentrated in vacuo. The residue is crystallized from ethanol-ether to give 4-hydroxy-α-(isopropylaminomethyl)-3-(N'-methylureido)benzyl alcohol hydrochloride.

Similarly, employing n-butylamine in the initial reaction with the isocyanate and proceeding in the above sequence of reactions yields the corresponding N'-n-butylureido derivatives and the product 3-(N'-n-butylureido)-4-hydroxy-α-(isopropylaminomethyl)-benzyl alcohol.

Reacting isopropylamine with the isocyanate and following through as above furnishes as the final product, 4-hydroxy-α-(isopropylaminomethyl)-3-(N'-isopropylureido)-benzyl alcohol.

EXAMPLE 3

Following the procedures outlined in Example 1, the hydrobromide salt of 4-benzyloxy-α-bromo-3-ureidoacetophenone is reacted with N-benzylcyclopentylamine to give 4-benzyloxy-α-(N-benzylcyclopentylamino)-3-ureidoacetophenone hydrochloride. Similar hydrogenation over palladium-on-carbon gives α-(cyclopentylaminomethyl)-4-hydroxy-3-ureidobenzyl alcohol.

Reacting 4-benzyloxy-α-bromo-3-ureidoacetophenone with N-benzyl-3,4-dimethoxyphenylisopropylamine followed by hydrogenation furnishes the product α-[2-(3,4-dimethoxyphenyl)-1-methylethylaminomethyl]-4-hydroxy-3-ureidobenzyl alcohol.

Similarly, employing N-benzylcyclopropylmethylamine in the above reaction followed by hydrogenation there is obtained α-(cyclopropylmethylaminomethyl)-4-hydroxy-3-ureidobenzyl alcohol.

EXAMPLE 4

Following the procedures of Example 2, 4-benzyloxy-α-bromo-3-(N'-methylureido)-acetophenone is reacted with N-benzylphenylisopropylamine to give 4-benzyloxy-α-(N-benzyl phenylisorpropylamino)3-(N'-methylureido)-acetophenone which is hydrogenated to yield 4-hydroxy-3-(N'-methylureido)-α-(2-phenyl-1-methylaminomethyl)-benzyl alcohol.

Similarly, reaction of the 4-benzyloxy-α-bromoacetophenone with N-benzyl-3,4-dibenzyloxyphenylisopropyl amine yields as the final product α-[2-(3,4-dihydroxyphenyl)-1-methylethylaminomethyl]-4-hydroxy-3-(N'-methylureido)-benzyl alcohol.

Reacting 4-benzyloxy-α-bromo-3-ureidoacetophenone with N-benzyl-4-benzyloxyphenylisopropylamine followed by hydrogenation gives α-[2-(4-hydroxyphenyl)-1-methylethylaminomethyl]-4-hydroxy-3-ureidobenzyl alcohol.

EXAMPLE 5

As described in Example 1, the isocyanate prepared from 3-amino-4-benzyloxyacetophenone is reacted with aniline to give 4-benzyloxy-3-(N'-phenylureido)-acetophenone which is brominated to 4-benzyloxy-α-bromo-3-(N'-phenylureido)-acetophenone. The latter is refluxed with N-benzyl-N-t-butylamine to give 4-benzyloxy-α-(N-benzyl-N-t-butylamino)-3-(N'-phenylureido)-acetophenone. Catalytic hydrogenation yields α-(t-butylaminomethyl)-4-hydroxy-3-(N'-phenylureido)-benzyl alcohol.

Similarly, reaction of the isocyanate with dimethylaminopropylamine to give 4-benzyloxy-3-(N'-dimethylaminopropylureido)-acetophenone followed by the above described reactions yields the product α-(t-butylaminomethyl)-3-(N'-dimethyl aminopropylureido)-4-hydroxybenzyl alcohol.

By employing dimethylaminoethylamine as described above there is obtained the corresponding α-(t-butylaminomethyl)-3-(N'-dimethylaminoethylureido)-4-hydroxybenzyl alcohol.

EXAMPLE 6

A solution of 40 g. of phosgene in 150 ml. of toluene at 25°C. is treated with 28.1 g. of 3-amino-4-benzyloxybutyrophenone in 250 ml. of toluene. The mixture is refluxed for 30 minutes and concentrated in vacuo to give the isocyanate. The latter (31.2 g.) is dissolved in 500 ml. of dry benzene and the solution saturated with ammonia to yield 4-benzyloxy-3-ureidobutyrophenone.

To a stirred solution of 6.4 g. of the above prepared 3-ureidobutyrophenone in 125 ml. of chloroform is added 3.2 g. of bromine. After stirring at room temperature for about 45 minutes the reaction mixture is concentrated in vacuo at 25°–30°C. The hydrobromide salt of 4-benzyloxy-α-bromo-3-ureidobutyrophenone thus obtained is dissolved in 100 ml. of acetonitrile and 9.8 g. of N-benzyl-N-t-butylamine is added. The mixture is refluxed for 1.5 hours, cooled and filtered. The filtrate is acidified with ethereal hydrogen chloride to give 4-benzyloxy-α-(N-benzyl-N-t-butylamino)-3-ureidobutyrophenone hydrochloride.

A solution of 11.7 g. of the above prepared hydrochloride in 75 ml. of methanol and 25 ml. of water is added to a suspension of 1.5 g. of 10% palladium-on-carbon in 10 ml. of water. The mixture is hydrogenated on the Parr apparatus at room temperature to yield α-(1-t-butylaminopropyl)-4-hydroxy-3-ureidobenzyl alcohol hydrochloride.

Similarly, by employing 3-amino-4-benzyloxypropiophenone in the initial reaction with phosgene and following through the above sequence of reactions there is obtained the corresponding product, α-(1-t-butylaminoethyl)-4-hydroxy-3-ureidobenzyl alcohol hydrochloride.

EXAMPLE 7

A solution of 23.4 g. (0.0785 m.) of 4-benzyloxy-3-(N'-methylureido)-acetophenone (prepared as in Example 2) and 6.7 g. (0.0785 m.) of 2-pyrrolidone in 785 ml. of dry tetrahydrofuran is stirred at room temperature while a solution of 39 g. (0.0785 m.) of pyrrolidone hydrotribromide in 785 ml. of dry tetrahydrofuran is added dropwise. The resulting solution is stirred overnight at room temperature, filtered and the filtrate evaporated in vacuo at 50°C. to give 4-benzyloxy-α-bromo-3-(N'-methylureido)-acetophenone (identical to material prepared in Example 2), m.p. 178.5°–181.5°C.

A mixture of 7.56 g. (0.02 m.) of the above bromoacetophenone and 6.52 g. (0.04 m.) of N-benzyl-t-butylamine and 120 ml. of acetonitrile is stirred and refluxed for 2 hours. The cooled reaction mixture is diluted with 120 ml. of ether, filtered and the filtrate is acidified with ethereal hydrogen chloride to give the hydrochloride of 4-benzyloxy-α-(N-benzyl-N-t-butylamino)-3-(N'-methylureido)-acetophenone. The latter is dissolved in 70 ml. of ethanol and 30 ml. of water and reduced with 0.5 g. of palladium-on-carbon, at 60 psi hydrogen and room temperature to yield α-(t-butylaminomethyl)-4-hydroxy-3-(N'-methylureido)-benzyl alcohol hydrochloride, m.p. 185°–187°C.

EXAMPLE 8

A mixture of 20 g. (0.083 m.) of 3-amino-4-benzyloxyacetophenone and 230 ml. of ethyl formate is stirred and refluxed for 24 hours. The resulting solution is evaporated in vacuo and the residue is dissolved in methylene chloride and washed with dilute acid. The dried organic solution is evaporated in vacuo to give the N-formyl derivative, 119.5°–122.5°C.

To a stirred solution of 13.5 g. (0.05 m.) of 4-benzyloxy-3-formamidoacetophenone in 60 ml. of dimethylsulfoxide under nitrogen is added 2.1 g. (0.05 m.) of a 57% dispersion of sodium hydride in mineral oil. The mixture is stirred for about 15 minutes, then cooled in an ice-bath and 8.0 g. (0.055 m.) of methyl iodide in 20 ml. of dimethylsulfoxide is added dropwise. The resulting mixture is stirred at room temperature for about 10 minutes, then heated to 55°–60°C. for 30 minutes. The clear solution is poured into a large volume of ice-water, extracted with ethyl acetate and the dried extract is concentrated to yield 4-benzyloxy-3-(N-methylformamido)-acetophenone, m.p. 75°–78°C.

To a solution of 10.0 g. (0.18 m.) of potassium hydroxide in 15 ml. of water is added a solution of 12.5 g. (0.044 m.) of 4-benzyloxy-3-(N-methylformamide)-acetophenone in 100 ml. of ethanol. The resulting mixture is refluxed for 90 minutes, concentrated in vacuo and the residue is diluted with water. This mixture is extracted with ether and the dried extract is concentrated to give 4-benzyloxy-3-methyl aminoacetophenone, m.p. 66°–67°C. The same material is obtained by a 30 minute reflux in 5% hydrochloric acid in 50% aqueous ethanol.

A solution of 40.8 g. (0.16 m.) of 4-benzyloxy-3-methylaminoacetophenone in 480 ml. of acetic acid and 160 ml. of water is stirred at 40°C. while a slurry of 23.5 g. of 90% sodium cyanate (21.2 g., 0.32 m.) in 160 ml. of water is added in portions. The resulting solution is stirred at 40°C. for 1 hour, diluted with 1600 ml. of water and extracted with methylene chloride. The extract is washed with sodium carbonate, dried and evaporated in vacuo to give 4-benzyloxy-3-(N-methylureido)-acetophenone, m.p. 143°–146°C.; hydrochloride, m.p. 141°–144°C.

A solution of 2.98 g. (0.01 m.) of 4-benzyloxy-3-(N-methylureido)-acetophenone in 25 ml. of chloroform is acidified with ethereal hydrogen chloride, then a stream of nitrogen is passed through the solution to remove the ether. This solution is stirred and 1.6 g. (0.01 m.) of bromine in 5 ml. of chloroform is added all at once. Nitrogen is passed through the solution to remove hydrogen bromide and the solution is washed with water/sodium bicarbonate. The dried solution is concentrated to a residue of α-bromo-4-benzyloxy-3-(N-methylureido)-acetophenone, m.p. 141°–142°C. (dec.).

To a suspension of 2.5 g. (0.0067 m.) of the above bromo acetophenone in 20 ml. of acetonitrile is added 2.2 g. (0.0134 m.) of N-benzyl-N-t-butylamine. The solution is stirred and refluxed for 1 ½ hours, cooled, ether is added and the mixture is filtered. The filtrate is diluted with water and the separated ether layer is washed with water, dried and concentrated to give the free base 4-benzyloxy-α-(N-benzyl-N-t-butylamino)-3-(N-methylureido)-acetophenone, nitrate, m.p. 163°–164°C. (dec.).

A solution of the above acetophenone in ethanol is acidified with ethereal hydrogen chloride and the filtered solid is dissolved in ethanol. A mixture of this solution and 10% palladium-on-carbon is hydrogenated on the Parr apparatus at room temperature using an initial pressure of 60 psi hydrogen. The mixture is filtered and the filtrate is concentrated in vacuo to give an amorphous solid, α-(t-butylaminomethyl)-4-hydroxy-3-(N-methylureiod)-benzyl alcohol hydrochloride.

EXAMPLE 9

To a solution of 12.0 g. (0.0446 m.) of 3-amino-4-benzyloxybutyrophenone in 25 ml. of water and 125 ml. of acetic acid at 40°C. is added a slurry of 5.88 g. (0.0905 m.) of soidum cyanate in water. The resulting mixture is stirred for 1 hour and filtered to give the solid 4-benzyloxy-3-ureidobutyrophenone, m.p. 164°–165°C.

The above butyrophenone (12.2 g., 0.0391 m.) in 250 ml. of tetrahydrofuran with 3.33 g. (0.0391 m.) of 2-pyrrolidone at room temperature is reacted, dropwise, with a solution of 19.8 g. (0.0391 m.) of pyrrolidone hydrotribromide in about 250 ml. of tetrahydrofuran. The reaction mixture is shielded from light and stirred for 40 hours. After filtration the filtrate from the reaction mixture is evaporated, the residue is dissolved in chloroform and this solution is washed with aqueous sodium thiosulfate, then water. The dried solution is evaporated to yield 4-benzyloxy-α-bromo-3-ureidobutyrophenone, m.p. 170°–172°C.

To a slurry of 10.0 g. (0.0255 m.) of the above bromo ketone in 300 ml. of acetonitrile is added an excess of N-benzyl-N-isopropylamine and the mixture is refluxed for 2 hours. The cooled reaction mixture is filtered and the filtrate is acidified with ethereal hydrogen chloride. The resulting hydrochloride is dissolved in 70 ml. of methanol and 30 ml. of water and hydrogenated with 10% palladium-on-carbon in the Parr apparatus at room temperature and 60 psi. The catalyst is filtered and the filtrate evaporated in vacuo to yield 4-hydroxy-α-(1-isopropylaminopropyl)-3-ureidobenzyl alcohol hydrochloride, m.p. 224°C.

EXAMPLE 10

A mixture of 25.5 g. (0.1 m.) of 4-benzyloxy-3-methylaminoacetophenone (prepared as in Example 8), 5.7 g. of of methyl isocyanate and 100 ml. of toluene is stirred at 250 for two hours. Filtering the reaction mixture and evaporating the filtrate yields 4-benzyloxy-3-(N,N'-dimethylureido)-acetophenone.

Reaction of the above acetophenone as described in Example 8 to give the α-bromo derivative which is then treated with N-benzyl-N-t-butylamine followed by hydrogenation with palladium-on-carbon furnishes as the final product, α-(t-butylaminomethyl)-3-(N,N'-dimethylureido)-4-hydroxybenzyl alcohol hydrochloride.

EXAMPLE 11

| Ingredients | Mg./Tablet |
|---|---|
| α-(t-Butylaminomethyl)-4-hydroxy-3-ureidobenzyl alcohol hydrochloride | 5.68* |
| Lactose | 107 |
| Starch | 7 |
| Magnesium stearate | 0.7 |

*Equivalent to 5 mg. of the free base

A granulation of the above ingredients is compressed with punches having 9/32 inch diameter.

EXAMPLE 12

| Ingredients | Mg./Dose |
|---|---|
| α-(t-Butylaminomethyl)-4-hydroxy-3-ureidobenzyl alcohol hydrochloride | 0.125 |
| Alcohol, U.S.P. | 17 |
| Propellant (20% Freon 12/ 80% Freon 114 mixture) | 33 |

The above ingredients in an aerosol dispensing system with a metered valve furnishes the indicated amounts per dose.

What is claimed:

1. A pharmaceutical composition having β-adrenergic stimulant activity comprising a pharmaceutical carrier and an effective amount of compound of the formula:

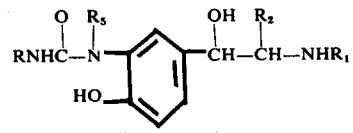

or a pharmaceutically acceptable acid addition salt of said compound, wherein:

R is hydrogen, straight or branched chain lower alkyl of from 1 to 5 carbon atoms, phenyl, dimethylaminoethyl or dimethylaminopropyl;

$R_1$ is branched chain lower alkyl of from 3 to 5 carbon atoms, cycloalkyl or cycloalkylmethyl, the cycloalkyl moiety having from 3 to 6 carbon atoms, or 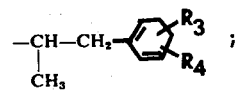

$R_2$ is hydrogen, methyl or ethyl;
$R_3$ and $R_4$ are hydrogen, hydroxy or methoxy; and
$R_5$ is hydrogen or methyl.

2. The composition of claim 1 in which $R_5$ is hydrogen.
3. The composition of claim 2 in which R is hydrogen.
4. The composition of claim 3 in which $R_2$ is hydrogen.
5. The composition of claim 4 in which $R_1$ is t-butyl.
6. The composition of claim 4 in which $R_1$ is cyclopentyl.
7. The composition of claim 1 in which R is methyl and $R_2$ and $R_5$ are hydrogen.
8. The composition of claim 7 in which $R_1$ is isopropyl.
9. The composition of claim 3 in which $R_2$ is methyl or ethyl.
10. The composition of claim 9 in which $R_2$ is ethyl and $R_1$ is t-butyl.
11. The composition of claim 9 in which $R_2$ is methyl and $R_1$ is t-butyl.
12. The composition of claim 2 in which R is methyl.
13. The composition of claim 12 in which $R_2$ is hydrogen and $R_1$ is t-butyl.
14. The composition of claim 1 in which R is hydrogen, $R_1$ is t-butyl, $R_2$ is hydrogen and $R_5$ is methyl.

15. A method of producing bronchodilator activity in an animal in need thereof which comprises administering orally or parenterally, to said animal, an effective amount of a compound as defined in claim 1.

16. The method of claim 15 in which $R_1$ is t-butyl and R, $R_2$ and $R_5$ are all hydrogen.

17. The method of claim 15 in which the active medicament is administered in a daily dosage regimen of about 6 to about 160 mg.

18. The composition of claim 1 in dosage unit form in which the active medicament is in an amount of about 3 to about 40 mg. per dosage unit.

19. The pharmaceutical composition of claim 1 in which the active medicament is incorporated with an inert pharmaceutically acceptable propellant in an aerosol dispensing system adapted to deliver a metered dose of the active medicament of about 100 to about 650 mcg.

* * * * *

UNITED STATES PATENT AND TRADEMARK OFFICE
CERTIFICATE OF CORRECTION

PATENT NO. : 3,917,847
DATED : November 4, 1975
INVENTOR(S) : Carl Kaiser and Stephen T. Ross It is certified that error appears in the above-identified patent and that said Letters Patent are hereby corrected as shown below:

Column 1, formula I should read:

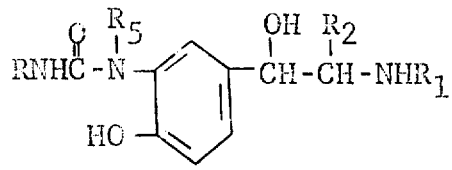

Column 3, the structural formula appearing between lines 55-65 should read:

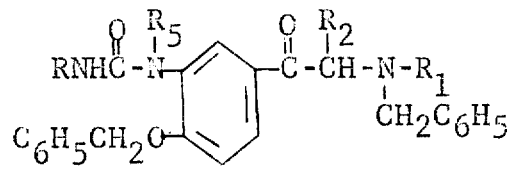

Column 10, claim 1, the structural formula appearing between lines 20-26 should read:

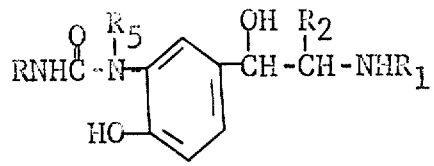

Signed and Sealed this tenth Day of February 1976

[SEAL]

Attest:

RUTH C. MASON
Attesting Officer

C. MARSHALL DANN
Commissioner of Patents and Trademarks